United States Patent
Olsen et al.

(10) Patent No.: US 7,444,757 B2
(45) Date of Patent: Nov. 4, 2008

(54) SYSTEM AND METHOD FOR ALIGNING A MACHINE-TOOL WITH A SPINDLE

(75) Inventors: Thomas Richard Olsen, Rock City, IL (US); Aaron Michael Sargent, Lena, IL (US)

(73) Assignee: T.R. Machine, Incorporated, Davis, IL (US)

( * ) Notice: Subject to any disclaimer, the term of this patent is extended or adjusted under 35 U.S.C. 154(b) by 0 days.

(21) Appl. No.: 11/542,371

(22) Filed: Oct. 3, 2006

(65) Prior Publication Data

US 2008/0078095 A1  Apr. 3, 2008

(51) Int. Cl.
B23B 23/04 (2006.01)

(52) U.S. Cl. .............................. 33/638; 33/642; 82/170; 408/127

(58) Field of Classification Search .................... 33/636, 33/638, 639, 640, 641, 642, 643, 644; 82/150, 82/151, 170; 408/75, 127, 239 A
See application file for complete search history.

(56) References Cited

U.S. PATENT DOCUMENTS

| | | | |
|---|---|---|---|
| 1,317,008 A | 9/1919 | Dohner et al. | |
| 2,202,117 A | 5/1940 | Müller | |
| 2,286,477 A | 6/1942 | Falls | |
| 2,368,736 A | 2/1945 | Wyrick | |
| 2,392,809 A * | 1/1946 | Cote | 408/139 |
| 2,411,621 A * | 11/1946 | Grubbs | 82/170 |
| 2,505,335 A * | 4/1950 | Miller | 408/139 |
| 2,534,333 A | 12/1950 | Wyrick | |
| 2,814,885 A | 12/1957 | Johns | |
| 3,264,941 A | 8/1966 | Miraglia | |
| 3,359,008 A * | 12/1967 | Stimmerman | 279/16 |
| 3,688,614 A | 9/1972 | Hardin | |
| 3,813,971 A | 6/1974 | Lemanski | |
| 3,835,666 A | 9/1974 | Hoffman | |
| 4,048,882 A | 9/1977 | Watkins | |
| RE29,612 E | 4/1978 | Fullerton | |
| 4,183,270 A | 1/1980 | Castagne | |
| 4,464,958 A * | 8/1984 | Luks | 82/127 |
| 4,626,151 A | 12/1986 | Dietrich | |
| 4,656,708 A | 4/1987 | Smith et al. | |
| 4,722,645 A * | 2/1988 | Regan | 408/239 A |
| 5,022,131 A | 6/1991 | Hobbs | |
| 5,048,384 A * | 9/1991 | Carlen | 82/170 |
| 5,739,654 A | 4/1998 | Doran et al. | |
| 5,887,500 A | 3/1999 | Natale | |

(Continued)

*Primary Examiner*—R. A. Smith
(74) *Attorney, Agent, or Firm*—Leydig, Voit & Mayer, Ltd

(57) ABSTRACT

Disclosed is an alignment tool. A body of the alignment tool fits into a turret block, while a head holds a machine-tool. During the alignment process, the head and body are allowed to move relative to one another in two dimensions perpendicular to an axis of rotation of a spindle. To align the alignment tool, a workpiece is inserted into the spindle. As the workpiece spins, a machine-tool cuts a taper in it. An "empty" alignment tool is brought to bear against the tapered workpiece. The axis of the head of the empty alignment tool, and thus the axis of any machine-tool held by the head, is aligned with the axis of the tapered workpiece and, thus, with the axis of the spindle. Once the machine-tool is aligned with the spindle, the head and body are tightly fastened together to preserve the alignment.

19 Claims, 6 Drawing Sheets

U.S. PATENT DOCUMENTS

| | | | |
|---|---|---|---|
| 6,003,415 A | 12/1999 | Turner et al. | |
| 6,134,998 A * | 10/2000 | Loeffler et al. | 82/162 |
| 6,311,591 B1 | 11/2001 | Grossmann | |
| 6,393,713 B1 | 5/2002 | French | |
| 6,401,348 B1 * | 6/2002 | Cavanaugh et al. | 33/502 |
| 6,640,404 B2 | 11/2003 | Sheehan et al. | |
| 2002/0032107 A1 | 3/2002 | Shehan et al. | |
| 2003/0029287 A1 | 2/2003 | Judas | |
| 2003/0177877 A1 * | 9/2003 | Nguyen | 82/150 |

* cited by examiner

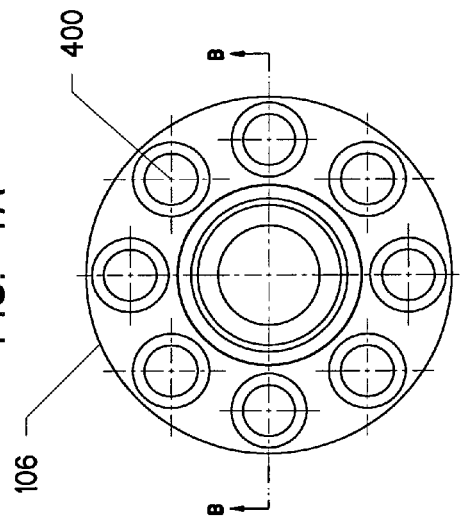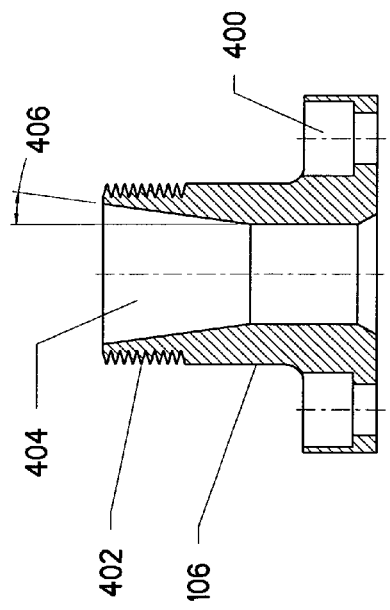

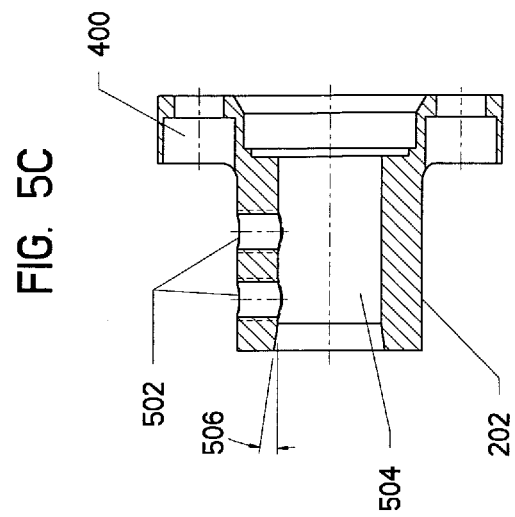
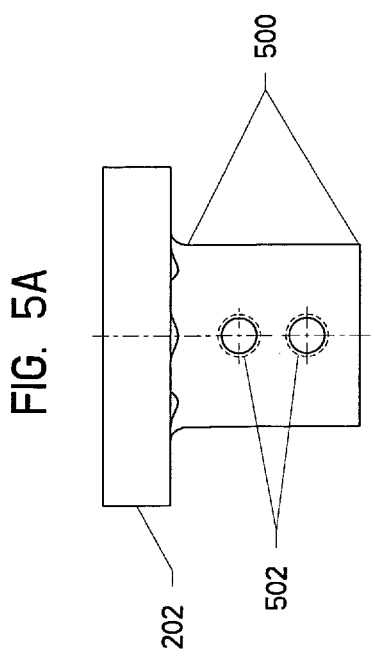
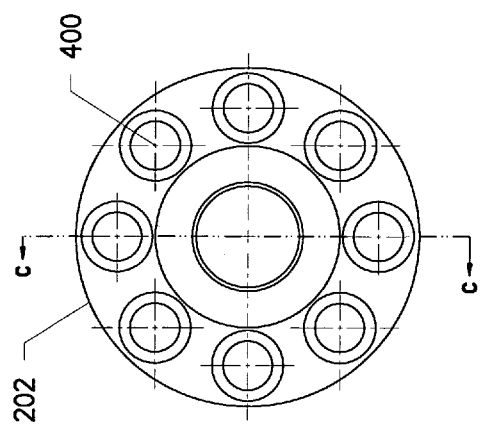

SYSTEM AND METHOD FOR ALIGNING A MACHINE-TOOL WITH A SPINDLE

FIELD OF THE INVENTION

The present invention is related generally to machine-tools, and, more particularly, to aligning a machine-tool with a spindle.

BACKGROUND OF THE INVENTION

In a typical small-scale drill press, a drill bit is held in a chuck or collet. The bit is then rotated and brought to bear against a workpiece. A typical lathe is similar, but it rotates the workpiece instead of the machine-tool. In these machines, keeping the machine-tool aligned with the workpiece is important but fairly straightforward.

The situation changes with the more complex machines used in industry. Often, these machines include a rotating turret disk that holds a number of toolholders. Each toolholder is available to hold one machine-tool. In operation, the turret disk is rotated so that a toolholder holding a machine-tool appropriate for the next machining step is moved into place. The machine-tool is then brought to bear on a workpiece held by a rotating spindle. These multiple-toolholder machines are very useful because they allow an operator, whether a human or a computer, to rapidly switch from one machine-tool to another without having to remove one machine-tool and then insert another. However, the movement of the toolholders into position and then out again has implications for alignment.

Ideally, once a machine-tool held in a toolholder is properly aligned with the axis of rotation of the spindle that holds the workpiece, this machine-tool can be moved away and back again without affecting the alignment. Reality intervenes, however, and the pressures and vibrations of the working machine, and wear on the machine-tool itself, gradually cause the machine-tool to work out of alignment. This is a well known problem, and for it there exist well known fixes. The primary fix involves expert aligners who come out and fix the alignment of the toolholders. As a job requiring great expertise, this is an expensive process. During the alignment, the multiple-toolholder machine may be out of operation for a significant amount of time. After all that, the machine-tools eventually go out of alignment again, and the expensive and time-consuming process must be repeated.

BRIEF SUMMARY OF THE INVENTION

In view of the foregoing, the present invention provides an alignment tool and a method for aligning a machine-tool with a spindle. The body of the alignment tool fits into a turret block. The body is attached to a head of the alignment tool. The head holds the actual machine-tool (by means of, for example, a self-centering collet). During the alignment process, the head and body are allowed to move relative to one another in two dimensions perpendicular to the axis of the spindle. Once the axis of the machine-tool is aligned with the axis of the spindle, the head and body are tightly fastened together to preserve the alignment.

In some embodiments, the head can accommodate machine-tools of various sizes. To further increase the usable range of the alignment tool beyond what one head can accommodate, multiple heads of various sizes can be provided that all work with a given body.

In a preferred method for aligning the alignment tool, a workpiece is inserted into a spindle. The workpiece is spun, and a machine-tool cuts a taper in it. This step ensures that the axis of rotation of the taper matches the axis of rotation of the spindle. Without removing the now tapered workpiece, an "empty" alignment tool (that is, one not holding a machine-tool) is indexed into position opposite the tapered workpiece. The connection between the alignment tool's head and body is loosened. The alignment tool is then brought to bear against the tapered workpiece. The taper causes the axis of the head of the alignment tool to match the axis of the taper. The alignment tool's head and body are then tightly connected. The axis of the head of the alignment tool, and thus the axis of any machine-tool held by the head, now matches the axis of the tapered workpiece and, thus, matches the axis of rotation of the spindle. With the alignment achieved, the tapered workpiece can be removed.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 4A is an end view of a collet-accepting head of an alignment tool;

FIG. 4B is a cross-section of a collet-accepting head of an alignment tool taken along the line B-B if FIG. 4A;

FIGS. 5A and 5B are views of a shank-accepting head of an alignment tool;

FIG. 5C is a cross-section of a shank-accepting head of an alignment tool taken along the line C-C of FIG. 5B.

DETAILED DESCRIPTION OF THE INVENTION

Figure 1:
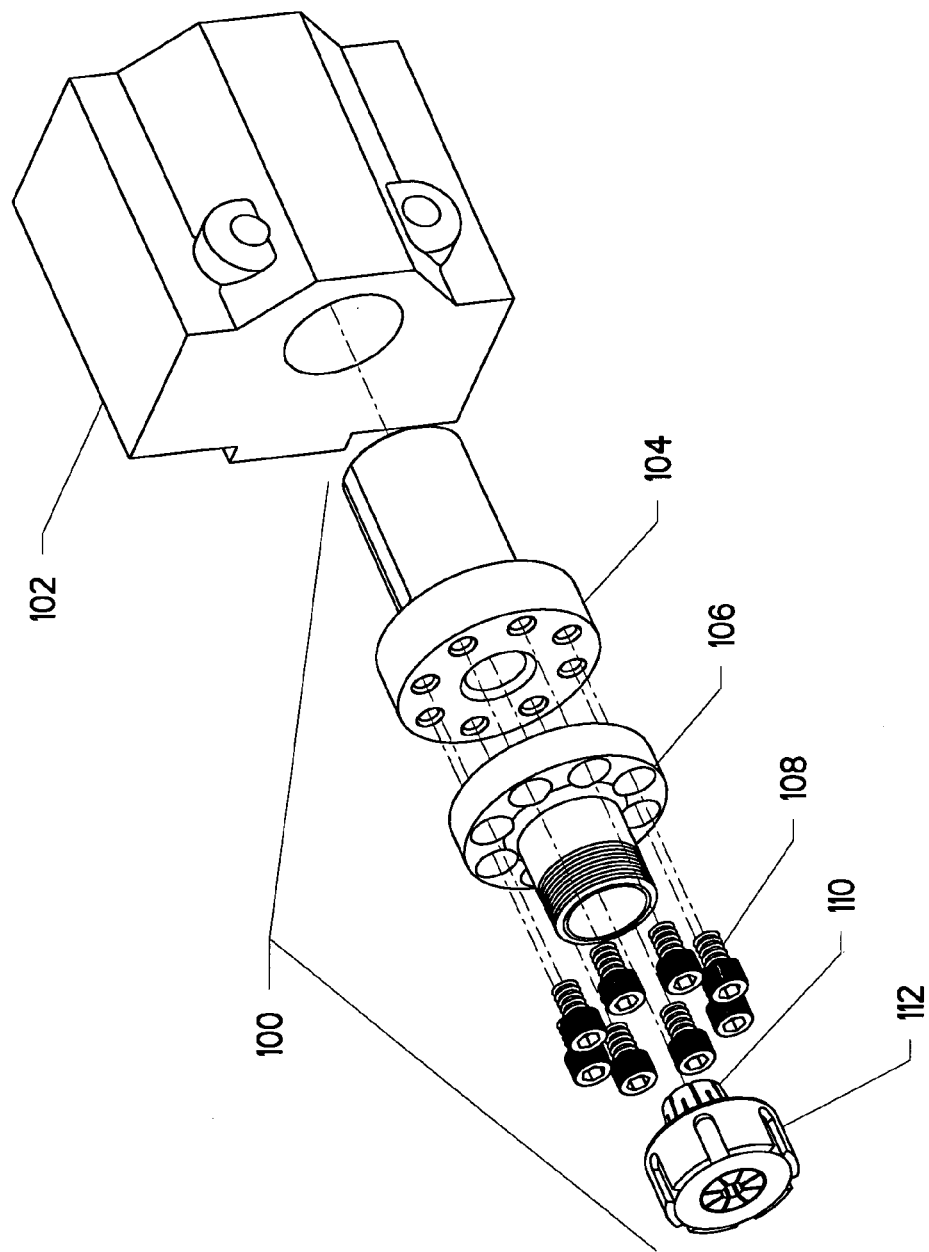
FIG. 1 is an assembly drawing of an alignment tool with a collet-accepting head according to the present invention.

Turning to the drawings, wherein like reference numerals refer to like elements, the present invention is illustrated as being implemented in a suitable environment. The following description is based on embodiments of the invention and should not be taken as limiting the invention with regard to alternative embodiments that are not explicitly described herein.

FIG. 1 shows an alignment tool 100 according to one embodiment of the present invention. In the figure, the alignment tool 100 is meant to be held by a turret block 102. As is well known in the art, a rotating turret disk (not shown) may support several turret blocks 102 to allow an operator, whether human or a computer, to rapidly switch from one machine-tool to another. In some of these multiple-toolholder machines, the turret disk rotates about a vertical axis, and the machine is then called a drill press (although it can do much more than drilling). In other machines, the turret disk rotates about a horizontal axis, and the machine is called a milling machine or a lathe. While the illustrations used in this application are mostly directed to a mill, the invention is independent of the orientation of the rotating turret disk.

The piece of the alignment tool 100 held by the turret block 102 is called the "body" 104. Attachable to the body 104 is a head 106. In FIG. 1, the head 106 attaches to the body 104 by eight machine screws 108 that fit through holes in the head 106 and screw into the body 104. As discussed below in reference to FIG. 4B, the machine screws 108 together form an attachment mechanism that, when loosened for an alignment process, allows the body 104 and head 106 to move relative to one another in two dimensions perpendicular to an axis of a workpiece-holding spindle (not shown). Other attachment mechanisms are possible, such as bolts that pass through both the body 104 and head 106 and are then secured by nuts.

In the embodiment of FIG. 1, a collet 110 is attached to the head 106 by a collet nut 112. The collet 110 holds a machine-tool (not shown) and centers the machine-tool along an axis of the collet 110.

The entire alignment tool 100 from the body 104 to the collet nut 112 can replace a traditional toolholder without having to modify either the turret block 102 or the machine-tools used with it.

Figure 2:
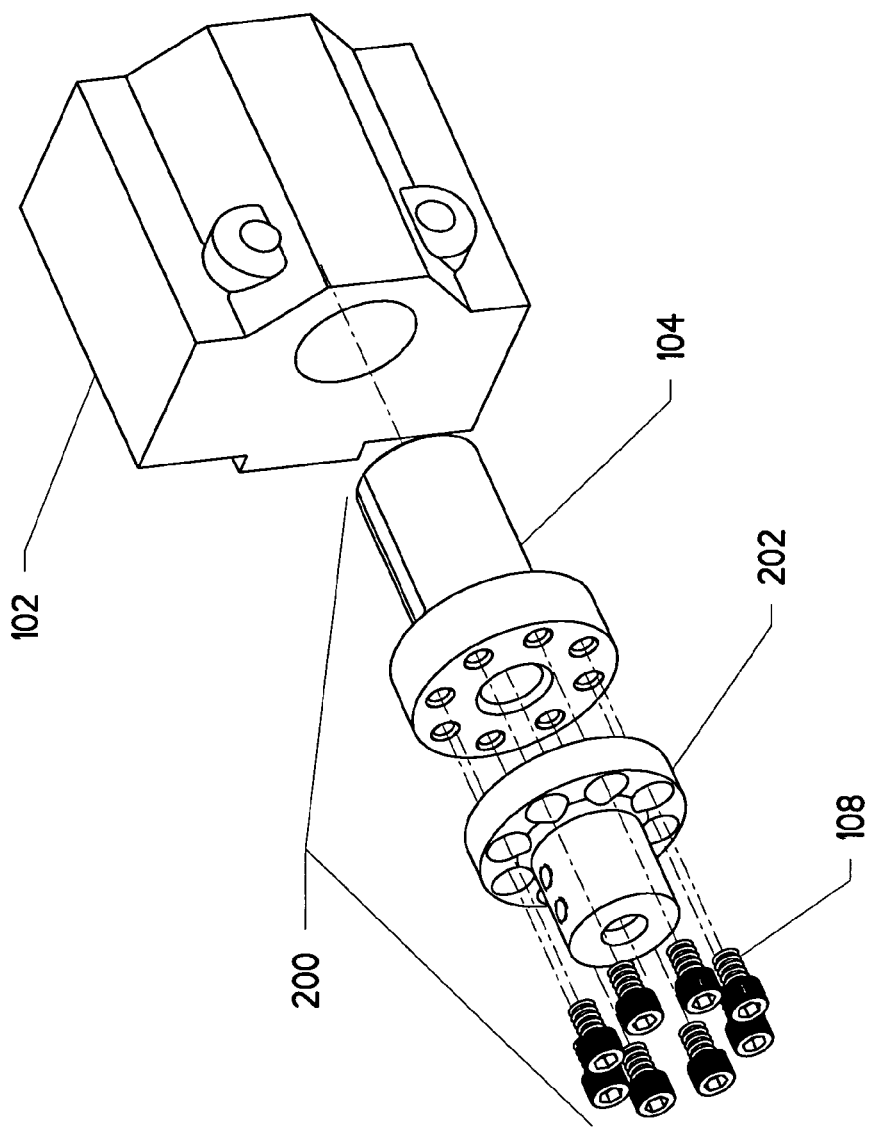
FIG. 2 is an assembly drawing of an alignment tool with a shank-accepting head.

FIG. 2 shows another alignment tool 200 according to a second embodiment of the present invention. This alignment tool 200 does not include the collet 110 of FIG. 1. instead the body 104 includes a hollow channel (see FIG. 5C) that accepts the shank of a machine-tool.

Figure 3C:
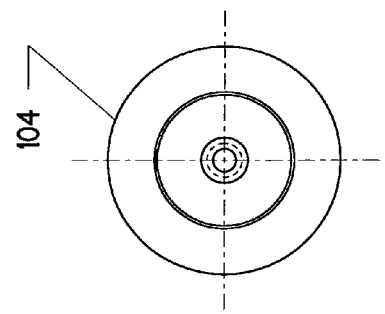
FIGS. 3A, 3B, and 3C are views of a body of an alignment tool.
Figure 3A:
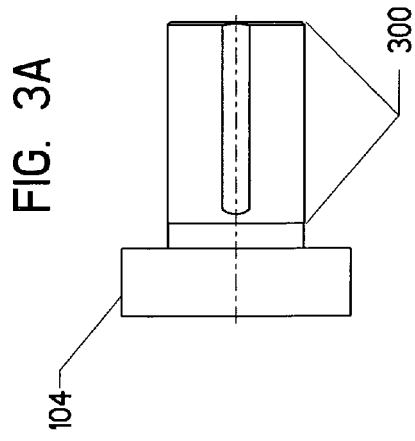

FIGS. 3A, 3B, 3C, and 3D illustrate the body 104 of the alignment tools 100, 200. FIG. 3A is a side view of the body 104. The length and diameter of the stem 300 are sized to fit snugly in a turret block 102. Differently sized bodies 104 can be used with differently sized heads 106, 202 to flexibly accommodate a large range of machine-tools in a large range of turret blocks 102.

Figure 3D:
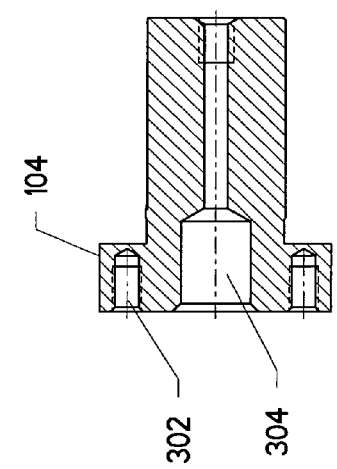
FIG. 3D is a cross-section of a body of an alignment tool taken along the line A-A of FIG. 3B.
Figure 3B:
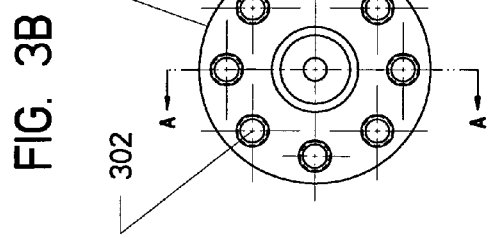

FIG. 3B shows one face of the body 104, while FIG. 3C shows the other face. The illustrated embodiment includes eight threaded holes 302 to receive the eight machine screws 108 of the attachment mechanism.

Sectioning the body 104 along line A-A of FIG. 3B produces FIG. 3D. It is clear how, in another embodiment, the threaded holes 302 could be replaced by unthreaded holes drilled through the body 104 to accommodate bolts. The cavity 304 in the middle of the body 104 accepts an end of a machine-tool.

FIG. 4A shows a face of the head 106 of the alignment tool 100 of FIG. 1. The cross-section of the head 106 in FIG. 4B illustrates a number of features of this particular embodiment. The through holes 400 used for attaching this head 106 to the body 104 are countersunk. The countersunk portions are made larger than the heads of the machine screws 108 that fit into them in order to allow freedom of movement of the head 106 relative to the body 104 when the machine screws 108 are not tightened.

The threads 402 on the outside surface of the head 106 accept the collet nut 112. The cavity 404 accepts a machine-tool which is held in place by the collet 110. The angle 406 at the entrance to the cavity 404 may be useful during the alignment process as discussed below. In some embodiments, a value of about 8 degrees works well for this angle 406.

FIGS. 5A, 5B, and 5C illustrate the shank-accepting head 202 of FIG. 2. The stem 500 of the head 202 includes at least one threaded hole 502 for securing the shank of a machine-tool. The face view of the shank-accepting head 202 in FIG. 5B may be compared to the similar view of the collet head 106 of FIG. 4A. By making the pattern and size of the through holes 400 identical in both embodiments, a given body 104 of the alignment tool 100, 200 can be made to accommodate heads 106, 202 of various types and sizes.

The cross-section in FIG. 5C shows clearly the cavity 504 that accepts the shank of a machine-tool. The diameter of this cavity is such as to accept the shank with a close tolerance. Machine screws thread into the one or more holes 502 and press against the shank of the machine-tool to secure its position in the head 202. Like the angle 406 of the collet head 106, the angle 506 of the shank-accepting head 202 at the entrance to the cavity 504 may be useful during the alignment process as discussed below. In some embodiments, a value of about 8 degrees works well for this angle 506.

Figure 6:
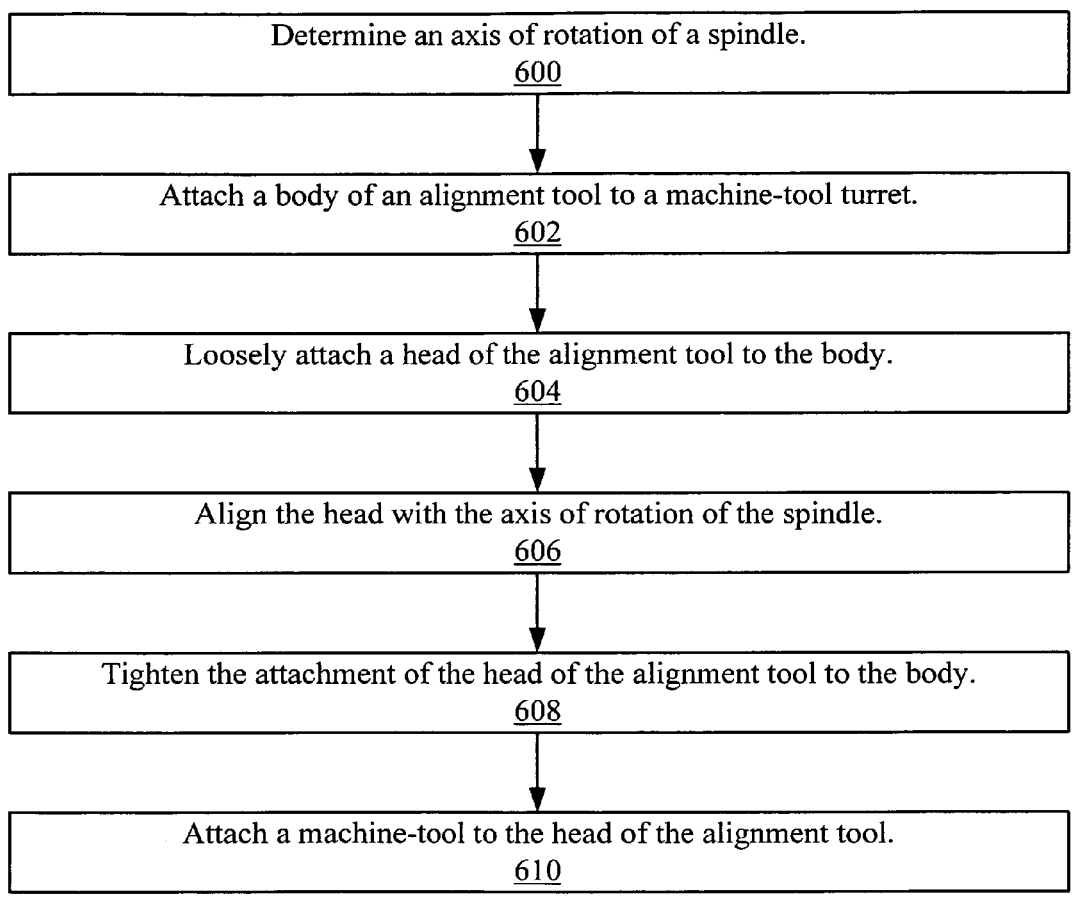
FIG. 6 is a flowchart of a preferred method for aligning a machine-tool with a spindle according to the present invention.

FIG. 6 depicts one method for using the alignment tool 100, 200 to align a machine-tool with the axis of rotation of a spindle. In drill presses or milling machines with multiple tool holders, a machine-tool is brought to bear on a workpiece held by a rotating spindle. The axis of rotation of the spindle does not change, but the axis of the machine-tool may gradually slip out of alignment with the spindle's axis. To reset the alignment, the method of FIG. 6 beings in step 600 by determining the axis of rotation of the spindle. One way to perform this step is by placing a piece of round stock in the spindle and spinning it. A machine-tool is then used to cut a tapered end in the workpiece. Because the taper is made by holding a cutting tool steady while the workpiece is spun by the spindle, the taper is created so that its axis of rotation necessarily matches the axis of rotation of the spindle.

Leaving the newly tapered workpiece in place in the spindle, a body 104 of an alignment tool 100, 200 is attached to a machine-tool turret 102 in step 602. (It is quite likely that step 602 is performed before step 600. Usually, the alignment tool 100, 200 used throughout the method of FIG. 6 is the same one used when cutting the taper of step 600. However, step 602 is explicitly called out because a different alignment tool 100, 200 may be used if desired.)

In step 604, a head 106, 202 is loosely attached to the body 104 of the alignment tool 100, 200. The attachment may be made by the machine screws 108 shown in FIGS. 1 and 2. If so, then the machine screws 108 are not fully tightened in this step. They are left loose enough to allow the head 106, 202 of the machine-tool 100, 200 to move relative to the body 104 in two dimensions perpendicular to the axis of rotation of the spindle.

In step 606, the alignment tool 100, 200 is brought to bear against the tapered workpiece, still held in the spindle, created in step 600. Note that the spindle is not rotating at this time. Note also that the alignment tool 100, 200 is not holding a machine-tool. Because of this, the cavity in the middle of the alignment tool 100, 200 which would normally hold a machine-tool can be placed against the tapered workpiece. In the embodiment of FIG. 1, for example, the hole in the centerline of the collet 110 can be placed against the tapered workpiece. Alternatively, the collet 110 and collet nut 112 can be removed and the head 106 can touch the tapered workpiece directly. The angle 406 of the head 106 (see FIG. 4B) can then help to bring the tapered workpiece to bear against the head 106, though the angle 406 is not required for this. In the embodiment of FIG. 2, the head 202 is brought to touch the tapered workpiece. The angle 506 of the head 202 (see FIG. 5C) can be useful here but is not required. In any case, because the head 106, 202 is only loosely attached to the body 104 of the alignment tool 100, 200, the taper of the workpiece can shift the head 106, 202 in two dimensions perpendicular to the axis of the taper. Thus, by pushing the alignment tool 100, 200 against the tapered workpiece, the center axis of the alignment tool 100, 200 is made to match the axis of the tapered workpiece (which is necessarily identical to the rotation axis of the spindle as discussed above).

In step 608, without removing the alignment tool 100, 200 from its position in contact with the tapered workpiece, the machine screws 108 are tightened to hold the head 106, 202 of the alignment tool 100, 200 firmly against the body 104. The alignment tool 100, 200, still firmly mounted in the turret 102, can then be moved away from the tapered workpiece.

The tapered workpiece is no longer needed and can be removed. The method ends in step 610 when a machine-tool is placed in the alignment tool 100, 200 and tightened. Note what has been achieved by the straightforward method of FIG. 6. A workpiece was created with an axis of rotation that matched the (nonvarying) axis of rotation of the spindle. The axis of that tapered workpiece was used to set the axis of the head 106, 202 of the alignment tool 100, 200. When a machine-tool is held by the alignment tool 100, 200, its axis matches that of the head 106, 202 of the alignment tool 100, 200 (because of the collet 110 or the shank-accepting cavity 504). In summary, the method of FIG. 6 quickly and economically ensures that the axis of the machine-tool is aligned with the axis of rotation of the spindle.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as the range of sizes of the alignment tools, are determined by specific situations. Therefore, the invention as described herein contemplates all such embodiments as may come within the scope of the following claims and equivalents thereof.

We claim:

1. An alignment tool for aligning a machine-tool with a spindle, the spindle configured for holding and for rotating a workpiece about an axis of rotation of the spindle, the alignment tool comprising:
    a collet for holding the machine-tool;
    a nut for attaching the collet to a head;
    the head;
    a body for attaching the alignment tool to a machine-tool turret block; and
    an attachment mechanism for attaching the head to the body, the attachment mechanism, in a first state, allowing freedom of movement of the head with respect to the body in two axes generally perpendicular to the axis of rotation of the spindle and, in a second state, allowing no such freedom of movement of the head with respect to the body;
    wherein the head includes a tapered aperture, the aperture tapering from a larger diameter toward a first end of the head nearer the spindle to a smaller diameter toward a second end of the head nearer the machine-tool turret block, the aperture configured for aligning the alignment tool with the spindle.

2. The alignment tool of claim 1 wherein the nut is configured for causing the collet to firmly hold the machine-tool when the nut is tightened to the head.

3. The alignment tool of claim 1 wherein the attachment mechanism comprises a plurality of screws, the screws comprising screwheads.

4. The alignment tool of claim 3 wherein the screws pass through holes in the head and thread into the body;
    the holes in the head allowing, when the attachment mechanism is in the first state and the screws are not tightened, the freedom of movement of the head with respect to the body; and
    the screws, when the attachment mechanism is in the second state and the screws are tightened thereby causing the screwheads to press the head against the body, allowing no such freedom of movement of the head with respect to the body.

5. The alignment tool of claim 3 wherein the screws pass through holes in the body and thread into the head;
    the holes in the body allowing, when the attachment mechanism is in the first state and the screws are not tightened, the freedom of movement of the head with respect to the body; and
    the screws, when the attachment mechanism is in the second state and the screws are tightened thereby causing the screwheads to press the body against the head, allowing no such freedom of movement of the head with respect to the body.

6. The alignment tool of claim 1 wherein the attachment mechanism comprises a plurality of paired nuts and bolts;
    the bolts having boltheads;
    the bolts passing through holes in the body and through holes in the head and threading into the nuts;
    the holes in the head allowing, when the attachment mechanism is in the first state and the bolts are not tightened, the freedom of movement of the head with respect to the body; and
    the bolts, when the attachment mechanism is in the second state and the bolts are tightened to the nuts thereby pressing the body against the head, allowing no such freedom of movement of the head with respect to the body.

7. The alignment tool of claim 1 wherein the body is adapted to receive, one at a time, a plurality of heads and wherein each of the plurality of heads is adapted to receive a collet of a particular size.

8. An alignment tool for aligning a machine-tool with a spindle, the spindle configured for holding and for rotating a workpiece about an axis of rotation of the spindle, the alignment tool comprising:
    a head for holding the machine-tool;
    a body for attaching the alignment tool to a machine-tool turret block; and
    an attachment mechanism for attaching the head to the body, the attachment mechanism, in a first state, allowing freedom of movement of the head with respect to the body in two axes generally perpendicular to the axis of rotation of the spindle and, in a second state, allowing no such freedom of movement of the head with respect to the body;
wherein the head includes a tapered aperture, the aperture tapering from a larger diameter toward a first end of the head nearer the spindle to a smaller diameter toward a second end of the head nearer the machine-tool turret block, the aperture configured for aligning the alignment tool with the spindle.

9. The alignment tool of claim 8 wherein the head is configured for holding the machine-tool by use of a screw threaded through a hole in the head, the screw, when tightened, capturing a shank of the machine-tool within the head.

10. The alignment tool of claim 8 wherein the body is adapted to receive, one at a time, a plurality of heads and wherein each of the plurality of heads is adapted to receive a shank of a machine-tool of a particular size.

11. The alignment tool of claim 8 wherein the attachment mechanism comprises a plurality of screws, the screws comprising screwheads.

12. The alignment tool of claim 11 wherein the screws pass through holes in the head and thread into the body;

the holes in the head allowing, when the attachment mechanism is in the first state and the screws are not tightened, the freedom of movement of the head with respect to the body; and the screws, when the attachment mechanism is in the second state and the screws are tightened thereby causing the screwheads to press the head against the body, allowing no such freedom of movement of the head with respect to the body.

13. The alignment tool of claim 11 wherein the screws pass through holes in the body and thread into the head;

the holes in the body allowing, when the attachment mechanism is in the first state and the screws are not tightened, the freedom of movement of the head with respect to the body; and the screws, when the attachment mechanism is in the second state and the screws are tightened thereby causing the screwheads to press the body against the head, allowing no such freedom of movement of the head with respect to the body.

14. The alignment tool of claim 8 wherein the attachment mechanism comprises a plurality of paired nuts and bolts;

the bolts having boltheads;

the bolts passing through holes in the body and through holes in the head and threading into the nuts;

the holes in the head allowing, when the attachment mechanism is in the first state and the bolts are not tightened, the freedom of movement of the head with respect to the body; and the bolts, when the attachment mechanism is in the second state and the bolts are tightened to the nuts thereby pressing the body against the head, allowing no such freedom of movement of the head with respect to the body.

15. A method for aligning a machine-tool with a spindle, the spindle configured for holding and for rotating a workpiece about an axis of rotation of the spindle, the method comprising:

determining the axis of rotation of the spindle;

attaching a body of an alignment tool to a machine-tool turret block;

loosely attaching a head of the alignment tool to the body, the attaching allowing freedom of movement of the head with respect to the body in two axes generally perpendicular to the axis of rotation of the spindle;

aligning the head with the axis of rotation of the spindle;

tightening the attachment of the head to the body;

attaching a machine-tool to the head;

wherein determining the axis of rotation of the spindle comprises:

placing a piece of stock in the spindle;

rotating the spindle in order to rotate the stock piece about the axis of rotation of the spindle, an axis of rotation of the stock piece thereby coinciding with the axis of rotation of the spindle; and bringing a machine-tool cutter to bear on the stock piece in order to cut a taper in the stock piece; and wherein aligning the head with the axis of rotation of the spindle comprises:

bringing the taper in the stock piece to bear on the head thereby causing a center-line axis of the head to coincide with the axis of rotation of the stock piece.

16. The method for aligning a machine-tool with a spindle of claim 15 wherein the head of the alignment tool includes a tapered aperture;

wherein the aperture tapers from a larger diameter toward a first end of the head nearer the spindle to a smaller diameter toward a second end of the head nearer the machine-tool turret block; and wherein aligning the head with the axis of rotation of the spindle comprises bringing the taper in the stock piece to bear on the tapered aperture of the head of the alignment tool thereby causing the axis of rotation of the spindle to coincide with an axis of the tapered aperture.

17. The method of aligning a machine-tool with a spindle of claim 15 wherein tightening the attachment of the head to the body comprises tightening screws or bolts attaching the head to the body while the head is held in alignment with the axis of rotation of the spindle.

18. The method of aligning a machine-tool with a spindle of claim 15 wherein attaching a machine-tool to the head comprises fitting a shank of the machine-tool into a collet and tightening a nut to hold the machine-tool in the collet and to hold the collect to the head.

19. The method of aligning a machine-tool with a spindle of claim 15 wherein attaching a machine-tool to the head comprises fitting a shank of the machine-tool into an aperture in the head and tightening a screw threaded through a hole in the head, the screw, when tightened, capturing the shank of the machine-tool within the head.

* * * * *